(12) United States Patent
Clark et al.

(10) Patent No.: US 7,431,344 B2
(45) Date of Patent: Oct. 7, 2008

(54) CONNECTION ASSEMBLY AND RELATED METHOD

(75) Inventors: Andrew C. Clark, Alto, MI (US); Michael J. Anderson, Allendale, MI (US); Raymond W. Boze, III, Grand Rapids, MI (US)

(73) Assignee: Cascade Engineering, Inc., Grand Rapids, MI (US)

( * ) Notice: Subject to any disclaimer, the term of this patent is extended or adjusted under 35 U.S.C. 154(b) by 178 days.

(21) Appl. No.: 11/204,861

(22) Filed: Aug. 16, 2005

(65) Prior Publication Data

US 2007/0040379 A1 Feb. 22, 2007

(51) Int. Cl.
*F16L 33/00* (2006.01)

(52) U.S. Cl. .......... 285/242; 285/81; 285/236; 285/321; 285/400; 285/403

(58) Field of Classification Search ........ 285/81, 285/242, 321, 400, 403, 226–229, 235–236, 285/404, 420
See application file for complete search history.

(56) References Cited

U.S. PATENT DOCUMENTS

| | | | |
|---|---|---|---|
| 2,832,130 A | 4/1958 | Harvey | |
| 2,936,184 A * | 5/1960 | Epstein | 285/81 |
| 3,217,400 A | 11/1965 | Illesy et al. | |
| 3,495,853 A | 2/1970 | Furrer | |
| 4,426,761 A * | 1/1984 | Sassak | 29/447 |
| 4,523,780 A | 6/1985 | Cheer | |
| 4,528,740 A * | 7/1985 | Sassak | 29/516 |
| 5,163,718 A | 11/1992 | Cannon | |
| 5,553,896 A | 9/1996 | Woodward | |
| 5,871,240 A | 2/1999 | Miyajima et al. | |
| 6,000,729 A | 12/1999 | Williamson et al. | |
| 6,343,772 B1 * | 2/2002 | Oi | 248/75 |
| 6,478,341 B1 | 11/2002 | Miyajima et al. | |
| 6,595,556 B1 | 7/2003 | Zenko et al. | |
| 2004/0003792 A1 | 1/2004 | Kono | |

* cited by examiner

*Primary Examiner*—Aaron Dunwoody
*Assistant Examiner*—Fannie Kee
(74) *Attorney, Agent, or Firm*—Warner Norcross & Judd LLP

(57) ABSTRACT

A connection system for sealingly interconnecting components of a high pressure fluid flow system, for example, an automobile engine air intake. The system can include a conduit defining a groove that is locked in a corresponding groove defined by a component, for example, an engine intake. An interlock ring is placed in the conduit groove. A clamp is placed over the interlock ring, however, the clamp and ring can be an integral component. When tightened, the clamp forces the ring into the conduit groove, which presses the conduit into sealing and/or locking engagement with the component groove.

15 Claims, 5 Drawing Sheets

CONNECTION ASSEMBLY AND RELATED METHOD

BACKGROUND OF THE INVENTION

The present invention relates to fluid flow systems, and more particularly to a system for connecting a conduit to a component of an air flow system.

Air and fluid flow systems are common in automobiles. Examples include air intake systems, fuel systems, and coolant circulation systems. These systems commonly include one or more components that are connected by a series of flexible or rigid tubes. The tubes and components are generally connected by a clamp that is tightened about the end of the tube and a portion of the component.

Many manufacturers attempt to design the connections of tubes and components in such systems so that the tube does not blow-off the component due to pressure inside the tube and/or component. One attempt to prevent such blow-off is achieved by outfitting the tube and the component with corresponding grooves that snap fit within one another. Although this provides a degree of blow-off prevention for relatively low pressure systems, it is unsatisfactory for systems that operate under higher pressure. Also, in higher pressure systems outfitted with such a connection, air leaks are common, as the snap fit connection sometimes does not effectively seal the system. In turn, such leaks can lead to hindered engine performance or premature engine wear or damage.

SUMMARY OF THE INVENTION

The aforementioned problems are overcome by a connection assembly including a conduit defining a groove that is locked in a corresponding groove defined on a component. An interlock ring is placed in the conduit groove. A clamp is placed over the interlock ring, however optionally, the clamp and ring can be an integral component. The clamp, when tightened forces the ring into the conduit groove, which presses the conduit into sealing and/or locking engagement with the component groove.

In one embodiment, the interlock ring partially circumferentiates the conduit and/or component, and fits within the conduit groove. The ring can be discontinuous, and include opposing ends, which draw near one another when the clamp is tightened.

In another embodiment, the interlock ring can interact with the conduit groove to press the conduit groove into contact with the component groove and/or the component at multiple points, thereby providing multiple seals at the conduit/component connection.

A corresponding method of installing the conduit with the connection assembly is also provided. The method includes fitting the conduit over the component, fitting the ring at least partially in the conduit groove, and clamping the ring into the conduit groove to sealingly couple the conduit to the component.

The connection assembly and related method provide an efficient way to connect components and tubes of a high pressure fluid flow system. The connection assembly allows manufacturers to easily attach conduits or tubes to components with the integrity, strength and sealing adequate for high pressure applications. In addition, the seal reduces the need for additional sealing rings. Further, due to its small number of parts, the connection assembly allows the tube and component to easily be separated for repair and replacement of the tube and/or component.

These and other objects, advantages, and features of the invention will be more fully understood and appreciated by reference to the description of the current embodiments and the drawings.

DESCRIPTION OF THE CURRENT EMBODIMENTS

I. Overview

Figure 1:
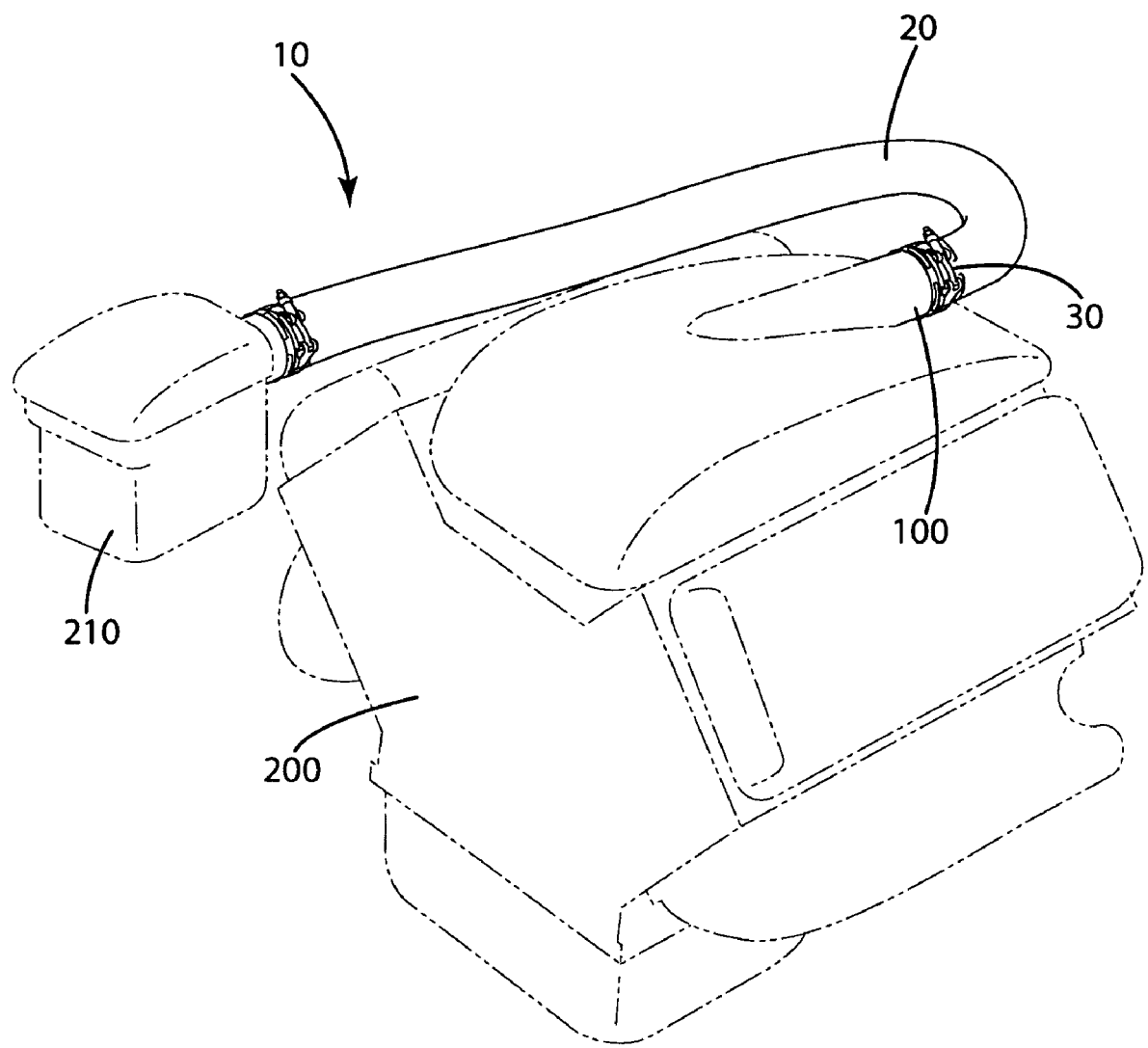
FIG. 1 is a perspective view of a connection assembly of one embodiment connecting two exemplary components.
Figure 2:
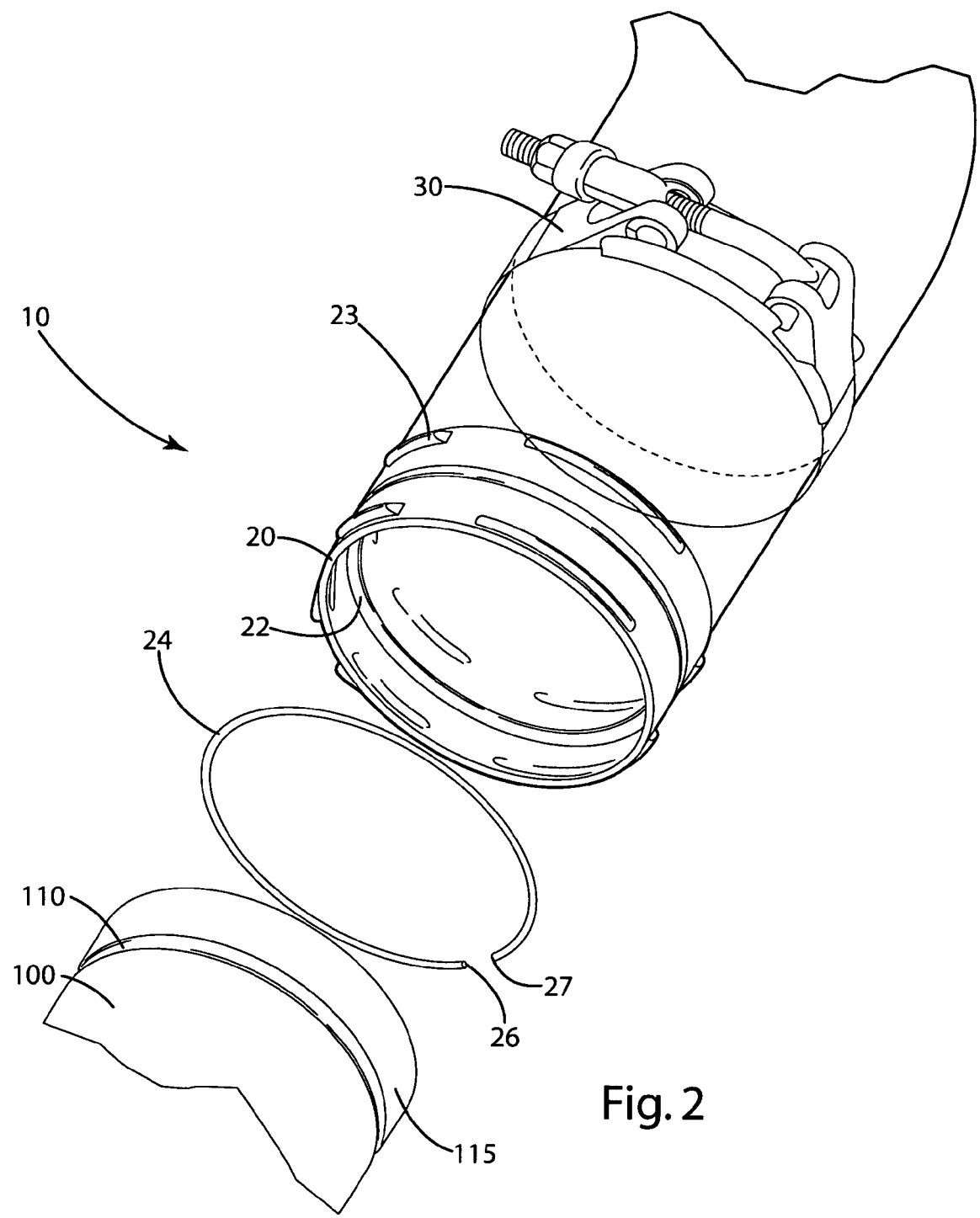
FIG. 2 is a perspective view of a connection assembly before connection to an engine intake.

An embodiment of the connector assembly is shown in FIGS. 1 and 2, and generally designated 10. The connector assembly 10 can include a tube, also referred to as a conduit 20, connecting one or more components 200, 210 of an air or fluid flow system. The conduit 20 of the connector assembly can define a conduit groove 22, which is reflected on the interior of the conduit. The conduit groove 22 locks in a corresponding groove 110 defined by the component 100. An interlock ring 24 is placed in the conduit groove 22. A clamp 30 is placed over the interlock ring and tightened to force the ring 24 into the conduit groove 22, which presses the conduit 20 into sealing and/or locking engagement with the component groove 110.

II. Construction

For purposes of disclosure, the connector assembly 10 is described in connection with an engine air intake, and in particular an air intake tube that connects an intake box 210 with an engine 200. The connector assembly, however, is well suited for a wide variety of fluid flows, including high pressure applications, such as automotive fuel filler systems, automotive cooling lines, and other air and fluid flow systems in both automotive and non-automotive applications. In all cases, at least one component 100 is designed to intake and/or exhaust fluid.

Figure 4:
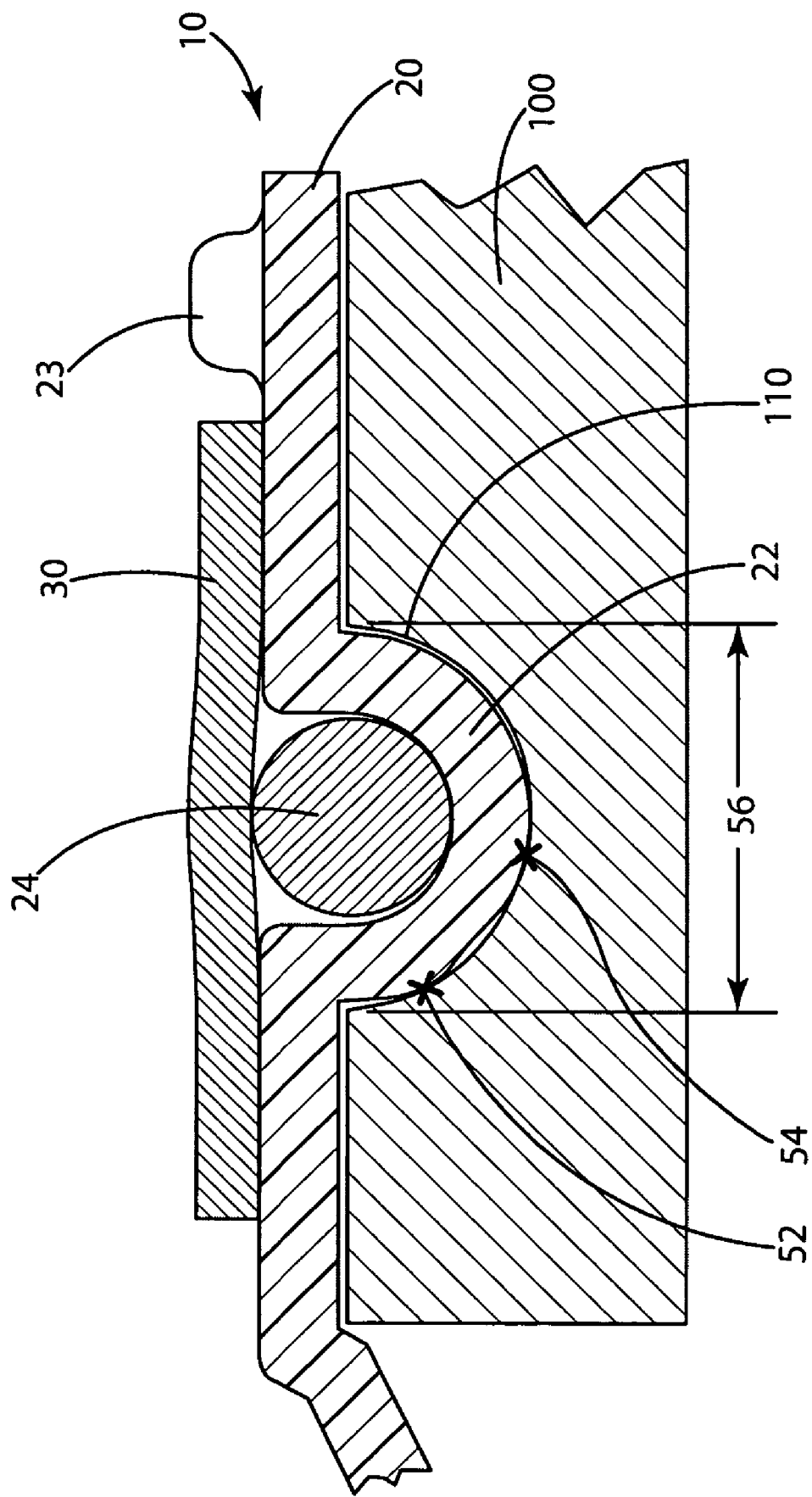
FIG. 4 is a cross sectional view of the connection assembly of FIG. 3 along line 4-4.

The intake 100 is shown in FIGS. 1 and 2. Although shown as having a circular cross section, the intake 100 can be of any cross section as desired, provided it mates well with the conduit 20. The intake defines an intake groove 110. This intake groove 110 is generally a semicircular recess that circumferentiates the intake opening. The semicircular recess can have a diameter 56 ranging from about 5.0 mm to about 25.4 mm, or any other diameter as the application requires. The groove can be other shapes other than semicircular as desired. The intake groove 110 can be sized slightly larger than the conduit groove 22 as described below so that the conduit groove 22 fits within the intake groove as shown in FIG. 4. In one embodiment, the outer diameter of the intake 100 is sized so that the conduit 20, including the conduit groove 22 reflected on the interior of the conduit, can be applied on the intake using a force with a lower limit of about 5 pounds and an upper limit of about 30 pounds.

The conduit 20 is also shown in FIGS. 1, 2 and 4 as having a generally circular cross section, but like the intake, can have other cross sections that mate well with the intake. The conduit can be constructed using a variety of forming techniques, such as blow molding, injection molding and the like, and can be constructed from a variety of materials, such as plastic or alloys, as desired. In one embodiment, the conduit is constructed from a plastic material that exhibits rigidity, expands slightly for application of the conduit to the intake 100, and is resistant to creep. In that embodiment, the conduit also can be constructed so that the interior around the intake exhibits a Shore D hardness having a lower limit of 20 and an upper limit of 150, and optionally a lower limit of 50 and a upper limit of 90. With this hardness, the conduit can expand, yet have the rigidity to withstand higher internal pressure, and still mate well and seal with the intake. One suitable material is a thermoplastic polyester elastomer offered under the trade name HYTREL, which is available from DuPont of Wilmington, Del.

Optionally, the interior surface of the conduit can be constructed to have a Shore D hardness that differs, for example is less than (softer than), the exterior surface of the conduit. In one construction, the conduit interior can have a Shore D hardness of about 56, while the exterior can have a Shore D hardness of about 73. The conduit material can also be of a thickness so that the conduit can carry air or fluids at high pressures, for example, at least about 15 psi, and optionally at least about 30 psi.

Figure 3:
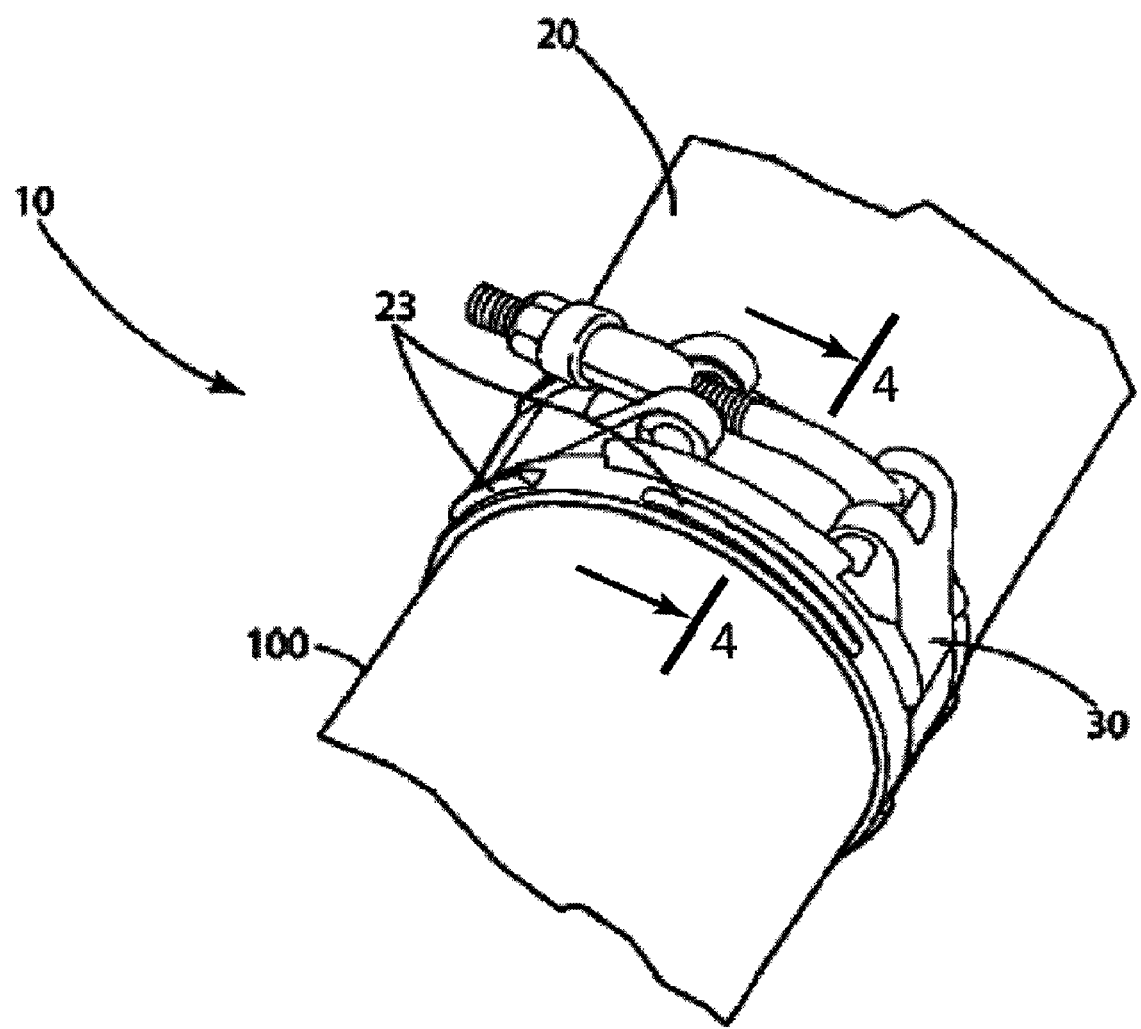
FIG. 3 is a perspective view of a connection assembly after connection to an engine intake.

The conduit can include several features, for example the clamp guides 23 shown in FIGS. 2 and 3, that assist in positioning the clamp on the conduit so that the clamp is around a sufficient portion of the intake 110. The conduit can also include other features such as fins, ribs or flex points that improve the rigidity or flexibility of the conduit, or assist a user in applying the conduit to the intake as desired.

As shown in FIGS. 2 and 4, the conduit 20 defines a groove 22 near the end of the conduit that optionally circumferentiates the conduit. This groove can be reflected on the interior of the conduit, that is, there is a corresponding projection on the interior of the conduit opposite the groove on the exterior. The groove 22 can be semicircular, and of a slightly smaller diameter than the intake groove within which it interfits. The groove can also be sized so that it can receive a ring 24 within it.

The ring 24, shown in FIGS. 2 and 4, can be discontinuous, having opposing ends 26 and 27. The ring can be sized so that when placed within the conduit groove 22, it does not exert significant clamping force on the conduit, that is, it fails to force the conduit into sealing engagement with the intake groove by itself. The ring is shown having a circular cross section, however, any cross section may be used as desired. Moreover, the ring shown is constructed of metal, but other materials can be used as desired.

III. Operation and Method of Installation

The operation of the connector assembly 10 will now be described in connection with the installation of the conduit 20 on the intake 100, as shown in FIGS. 2-4. As explained above, the conduit is applied to the intake with a force sufficient to ensure that the conduit groove 22 reflected on the interior of the conduit 20 rides up over the intake lip 115, and subsequently locks in the intake groove 110. Because the conduit groove closely fits within the intake groove, the conduit is at least partially secured to the intake in this manner.

To further secure the conduit to the intake, however, the discontinuous interlock ring 24 is placed over the end of the conduit 20 and at least partially sits within the groove 22. When seated in the groove, the ring is somewhat loose. Indeed, the ring itself need not exert a compressive force radially inward on the conduit. Moreover, although seated in the groove, the ring still may protrude slightly above the exterior surface of the conduit adjacent the groove.

With the ring thus seated in the conduit groove 22, the clamp 30 is secured around the end of the conduit, and over the ring 24. The clamp is tightened to clamp around the conduit and ring. As this occurs, the opposing ends of the ring 26, 27 draw nearer one another, and the ring 24 is forced into the conduit groove 22. Consequently, the conduit groove 22, and thus the conduit 20 by which the groove is defined, is forced into the intake groove 110. In so doing, the conduit groove sometimes deforms. Frequently, as this occurs, multiple points or areas 52, 54 on the conduit groove are pressed into sealing engagement with the intake groove 110. In turn, this creates multiple seal beads and/or contact points between the conduit and the intake, leading to a superior fluid-leak-free connection. Alternatively, or additionally, the ring 24 presses the conduit groove into sealing engagement with the intake groove over a larger area, for example, the entire area between points 52 and 54. It also has been discovered that as long as the material is flexible, for example constructed from materials such as those described herein, the area of sealing engagement can be increased.

Further, because the ring 24 interlocks the conduit groove 22 within the intake groove 110 so well, the connection assembly 10 offers a surprising and unexpected high level of blow-off resistance and leak protection over assemblies that do not include the ring. For example, the performance of a connection assembly including no interlock ring was compared with that of a connection assembly including the interlock ring as described above. In this comparison, the assemblies were secured to an intake, the clamp was tightened to a torque of 12 Nm, and air flow pressurized to 30 psi was conducted through the conduit and intake. The assemblies were monitored for blow-off, which meant that the conduit became at least partially disconnected from the intake, as well as air leakage at the conduit/intake junction. As a result of the testing, 2 of 10 assemblies without the ring blew off the intake, whereas 0 of 24 assemblies including the ring blew off the intake. Similarly, 1 of 9 assemblies without the ring leaked air at the conduit/intake junction, whereas 0 of 24 assemblies including the ring leaked air at the conduit/intake junction.

IV. Alternative Embodiment

Figure 5:
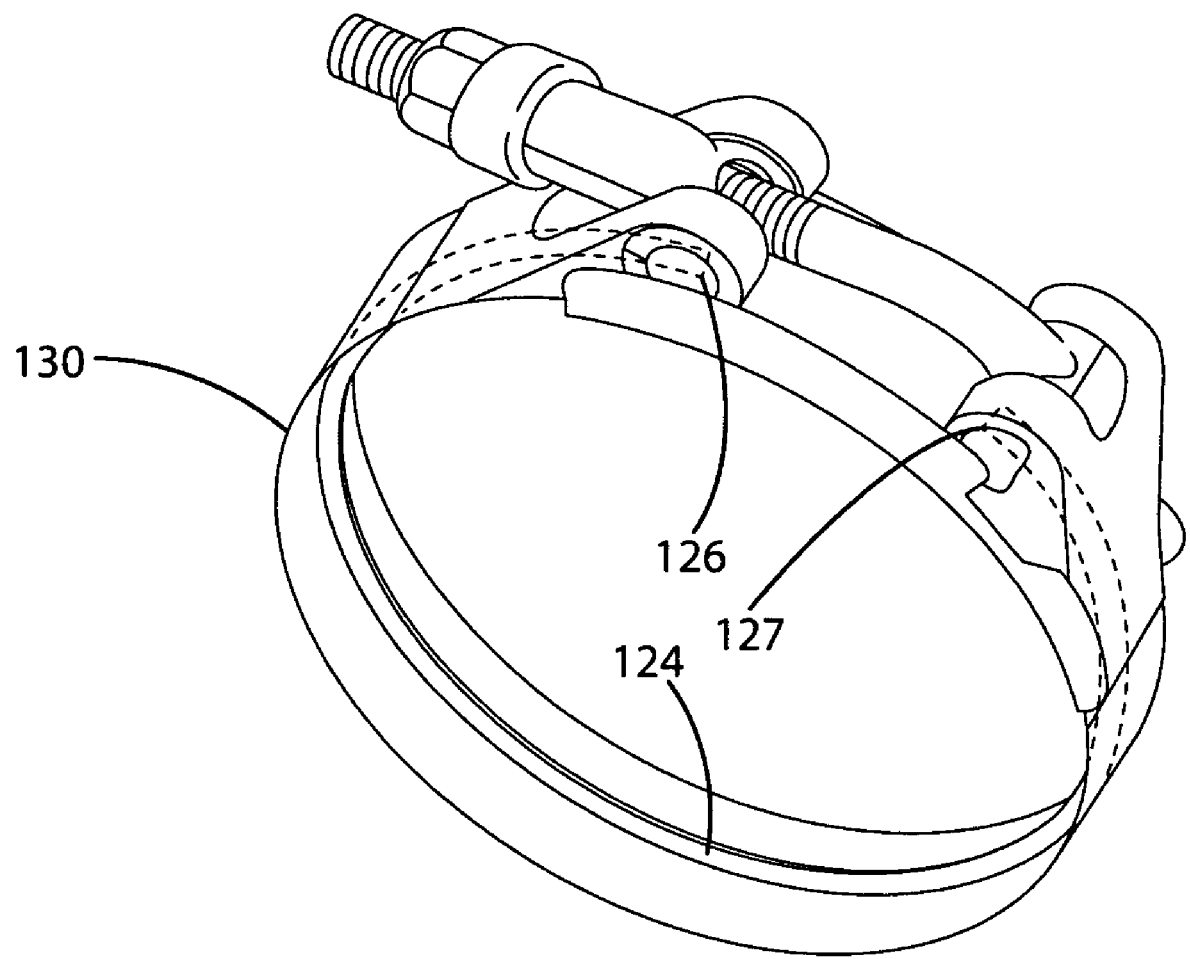
FIG. 5 is a perspective view of an alternative embodiment of the clamp of the connector assembly.

FIG. 5 shows an alternative embodiment of the clamp 130 of the connection assembly. There, the clamp 130 includes an integral interlock ring 124, including opposing ends 126, 127. The integral interlock ring nests within the conduit groove, and functions like the interlock ring 24 described above. The integral interlock ring can be of a variety of constructions, for example, it can be a groove stamped in the clamp band, or a wire welded or otherwise secured to the clamp band.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention claimed is:

1. An automobile air intake apparatus comprising:
an intake defining an intake groove;
a flexible conduit including an interior, an exterior and an end, the exterior defining a conduit groove around the end, the conduit groove reflected as a projection on the interior, the projection seated within the intake groove, thereby mating the conduit to the intake in a fixed position;

a discontinuous interlock ring positioned over the conduit end and in the conduit groove without exerting a substantial clamping force on the conduit, the discontinuous interlock ring including opposing ends; and a clamp positioned over the end to clamp the conduit end to the intake, wherein the clamp compresses the discontinuous interlock ring into the conduit groove to drive the conduit projection into sealing engagement with the intake groove on the intake, the ends of the discontinuous interlock ring being brought nearer one another as the projection is driven into sealing engagement with the intake groove on the intake, wherein the clamp continues to compress the discontinuous interlock ring within the conduit groove and remains positioned over the end of the conduit to maintain a connection between the end and the intake as the intake intakes air.

2. The automobile air intake apparatus of claim 1 wherein the conduit groove is of a substantially semicircular cross section.

3. The automobile air intake apparatus of claim 2 wherein the discontinuous interlock ring is of a circular cross section that mates with the semicircular cross section of the conduit groove.

4. The automobile air intake apparatus of claim 3 wherein the discontinuous interlock ring is constructed from metal.

5. The automobile air intake apparatus of claim 1 wherein the discontinuous interlock ring and the clamp are joined with one another so that the ring is on an interior portion of the clamp facing the conduit.

6. The automobile air intake apparatus of claim 1 wherein the discontinuous interlock ring is separate from the clamp and adjacent an interior portion of the clamp facing the conduit.

7. The automobile air intake apparatus of claim 1 wherein the clamp drives the conduit projection into sealing engagement with the intake groove without substantially deforming the intake groove.

8. A connection assembly comprising:

a component defining a component groove;

a conduit defining a conduit groove, the conduit fitted over the component so that the conduit groove interlocks with the component groove to secure the conduit to the component;

an interlock ring including opposing ends, the interlocking ring positioned in the conduit groove;

a clamp clamping the interlock ring into the conduit groove so that the conduit is forced into at least two points of sealing engagement with the component groove, the clamp remaining adjacent the conduit to retain the interlock ring in the conduit groove and to maintain the sealing engagement as fluids pass through the component and the conduit at pressures that are at least 15 psi.

9. The connection assembly of claim 8 wherein the interlock ring is integral with the clamp.

10. The connection assembly of claim 8 wherein the opposing ends draw closer to one another when the clamp clamps the interlock ring into the conduit groove.

11. The connection assembly of claim 8 wherein the component is an intake for an engine.

12. The connection assembly of claim 8 wherein the conduit is a tube constructed from a flexible, resilient polymer.

13. The connection assembly of claim 12 wherein the conduit includes an interior and an exterior, the polymer having a harder durometer on the exterior than on the interior.

14. The connection assembly of claim 8 wherein the interlock ring partially circumferentiates the conduit, and wherein the conduit fully circumferentiates the component.

15. The connection assembly of claim 8 wherein the conduit is deformed without the component groove being substantially deformed.

* * * * *